US012769534B2

(12) United States Patent
Tanimoto et al.

(10) Patent No.: US 12,769,534 B2
(45) Date of Patent: Oct. 20, 2026

(54) VEHICLE SYSTEM

(71) Applicant: DENSO CORPORATION, Kariya-city (JP)

(72) Inventors: Akira Tanimoto, Kariya-city (JP); Hiroyoshi Kunieda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 267 days.

(21) Appl. No.: 18/485,292

(22) Filed: Oct. 11, 2023

(65) Prior Publication Data

US 2024/0036856 A1 Feb. 1, 2024

Related U.S. Application Data

(63) Continuation of application No. PCT/JP2022/014478, filed on Mar. 25, 2022.

(30) Foreign Application Priority Data

Apr. 15, 2021 (JP) ................................ 2021-069092

(51) Int. Cl.
*G06F 8/65* (2018.01)
*B60R 16/023* (2006.01)

(52) U.S. Cl.
CPC .............. *G06F 8/65* (2013.01); *B60R 16/023* (2013.01)

(58) Field of Classification Search
CPC . G06F 8/65; G06F 8/60; B60R 16/023; B60R 16/00
USPC .......................................................... 717/172
See application file for complete search history.

(56) References Cited

U.S. PATENT DOCUMENTS

| | | | | |
|---|---|---|---|---|
| 2004/0167690 | A1 | 8/2004 | Yamada | |
| 2011/0126031 | A1 | 5/2011 | Oku | |
| 2018/0239896 | A1 | 8/2018 | Kato et al. | |
| 2019/0280893 | A1* | 9/2019 | Ninagawa | G06F 8/61 |
| 2021/0012588 | A1* | 1/2021 | Kwon | G07C 5/008 |
| 2023/0179659 | A1* | 6/2023 | Go | B60R 16/023 709/201 |

FOREIGN PATENT DOCUMENTS

| | | | |
|---|---|---|---|
| JP | 2004254092 | A | 9/2004 |
| JP | 6130617 | B1 | 5/2017 |
| WO | WO-2010116523 | A1 | 10/2010 |

OTHER PUBLICATIONS

U.S. Appl. No. 18/485,302, filed Oct. 11, 2023, Kunieda et al.

* cited by examiner

*Primary Examiner* — Bradley A Teets
*Assistant Examiner* — Zengpu Wei
(74) *Attorney, Agent, or Firm* — Harness, Dickey & Pierce, P.L.C.

(57) ABSTRACT

A vehicle system includes: a vehicle device having a first function that is commonly implemented regardless of a type of the vehicle system; and an external device that operates alone and independently from the vehicle device, has a second function that is selectively implemented in accordance with the type, and is connected to the vehicle device via a communication line. The vehicle device is configured to execute the second function via the external device. The external device is configured to execute the first function via the vehicle device.

6 Claims, 11 Drawing Sheets

VEHICLE SYSTEM

CROSS REFERENCE TO RELATED APPLICATIONS

The present application is a continuation application of International Patent Application No. PCT/JP2022/014478 filed on Mar. 25, 2022, which designated the U.S. and claims the benefit of priority from Japanese Patent Application No. 2021-069092 filed on Apr. 15, 2021. The entire disclosures of all of the above applications are incorporated herein by reference.

TECHNICAL FIELD

The present disclosure relates to a vehicle system used for a vehicle.

BACKGROUND

In recent years, for example, a device mounted on a vehicle is equipped with a plurality of functions. The device mounted on the vehicle is hereinafter referred to as a vehicle device.

SUMMARY

A vehicle system includes: a vehicle device having a first function that is commonly implemented regardless of a type of the vehicle system; and an external device that operates alone and independently from the vehicle device, has a second function that is selectively implemented in accordance with the type, and is connected to the vehicle device via a communication line. The vehicle device is configured to execute the second function via the external device. The external device is configured to execute the first function via the vehicle device.

BRIEF DESCRIPTION OF DRAWINGS

The above and other features and advantages of the present disclosure will become more apparent from the following detailed description made with reference to the accompanying drawings.

DETAILED DESCRIPTION

Figure 1:
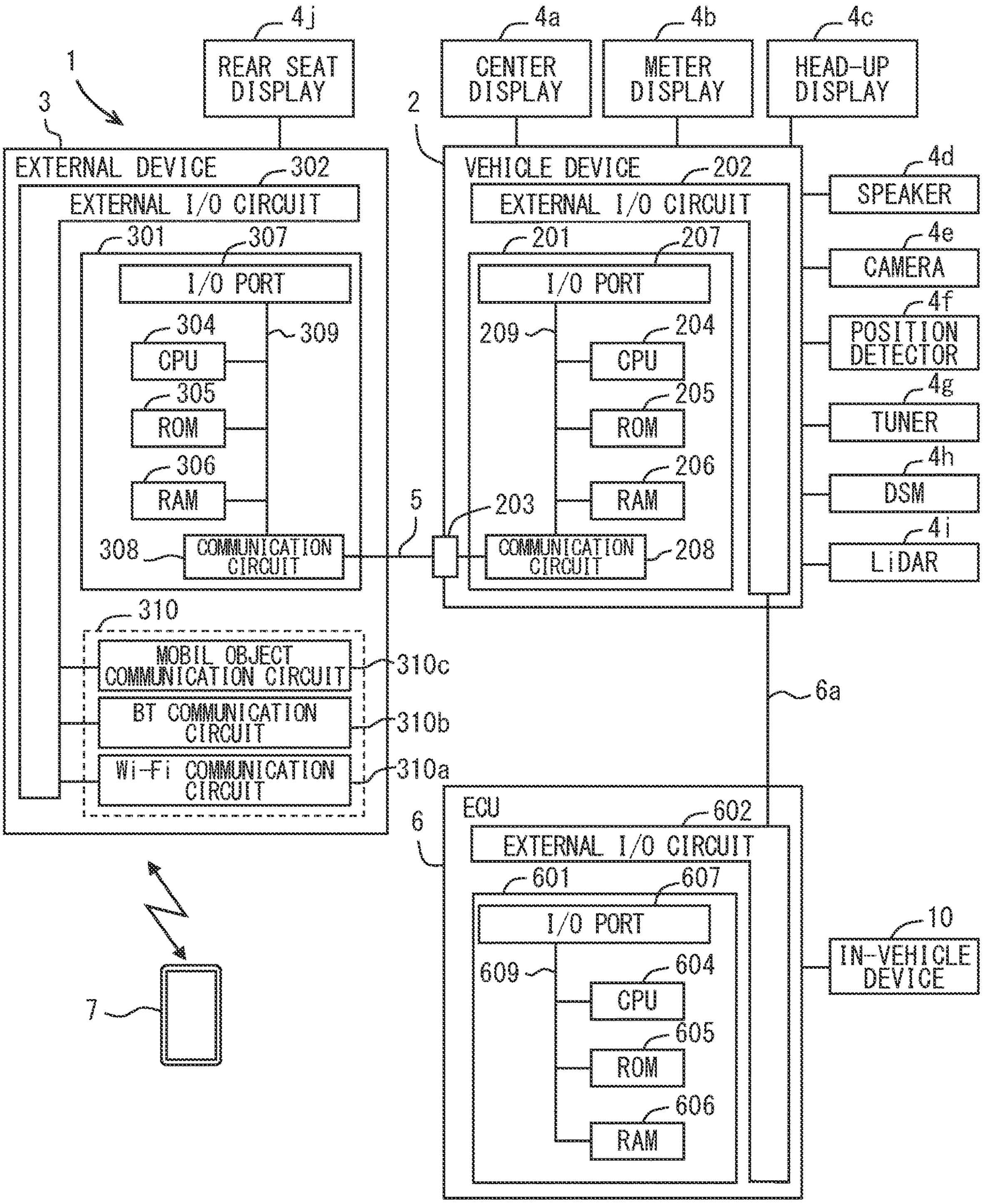
FIG. 1 is a diagram schematically showing a configuration example of a vehicle system according to a first embodiment.

By the way, functions installed in a vehicle device may differ depending on the type of product. For example, even in the same product group from the same manufacturer, relatively expensive products may have more functions and types than relatively inexpensive products. A plurality of such products have been prepared with different hardware configurations and software configurations.

However, in such a configuration, it is necessary to develop and design hardware and software for each product, and require a great deal of resources in terms of cost and manpower. Further, it is difficult to add or expand functions after shipment.

The present disclosure provides a vehicle system capable of developing and designing products while reducing resources even in a case where the products have different functions, and capable of easily expanding the functions.

According to one example embodiment, a vehicle system includes: a vehicle device having a first function that is commonly implemented regardless of a type of the vehicle system; and an external device that operates alone and independently from the vehicle device, has a second function that is selectively implemented in accordance with the type, and is connected to the vehicle device via a communication line. The vehicle device is configured to execute the second function via the external device. The external device is configured to execute the first function via the vehicle device. Thereby, according to the vehicle system, since the vehicle device has the common function, it is possible to perform the development and the design using the same hardware even when the product is different. It is possible to develop and design products while reducing resources even in a case where the products have different functions, and capable of easily expanding the functions.

Hereinafter, embodiments of the present disclosure will be described. Further, configurations that are substantially common in each embodiment will be described with the same reference numerals.

First Embodiment

Next, a first embodiment will be described. As shown in FIG. 1, a vehicle system 1 includes a vehicle device 2 and an external device 3. The vehicle device 2 and the external device 3 are implemented, for example, as a semiconductor integrated circuit configured by SoC, and are connected so as to be able to communicate with each other. Various periphery devices 4 mounted on a vehicle are connected to the vehicle device 2 so as to communicate with each other or be controlled by the vehicle device 2. However, although the details will be described later, FIG. 1 shows one configuration example of the vehicle system 1.

The vehicle device 2 and the external device 3 are communicably connected via a communication line 5. The vehicle system 1 is configured by the vehicle device 2 and the external device 3 operating in cooperation with each other. In the present embodiment, a USB communication path is assumed as the communication line 5, and the communication line 5 includes, as a physical configuration, a USB cable. The USB is an abbreviation for universal serial bus. However, the communication line 5 is not limited to the USB, and can include a wired LAN, wireless LAN, short-range wireless communication, or the like.

Further, the vehicle device 2 is communicably connected to ECUs 6, which are various electronic control units mounted on the vehicle, via a vehicle interior network 6*a*. The vehicle interior network 6*a* can employ CAN, for example. The ECU is an abbreviation for Electronic Control Unit, and the CAN is an abbreviation for Controller Area Network. Further, although one ECU 6 is shown for the simplification of description in FIG. 1, several ECUs 6 are mounted in the vehicle. Further, the connection with the ECU 6 is not limited to the CAN, and can be configured by LIN, FlexRay, or a so-called IP network.

The vehicle device 2 includes a controller 201 capable of executing functions provided when the vehicle is used, an external input-output circuit 202 for inputting and outputting various signals with the periphery device 4, an USB connector 203 connected to an external device 3 capable of communicating with the controller 201 and executing functions provided when the vehicle is used, and the like. Further, although in FIG. 1, the external input-output circuit 202 is shown as one block for simplification of explanation, the external input-output circuit 202 can include a plurality of circuits corresponding to the periphery device 4.

The controller 201 includes a CPU 204, a ROM 205, a RAM 206, an input-output port 207, a communication circuit 208 and the like, which are connected by a bus 209. The CPU 204 executes programs stored in the ROM 205 to execute various processes for controlling the vehicle device 2 and provides various functions implemented therein. The CPU 204 can be configured by one or a plurality of semiconductor devices.

The ROM 205 is a non-volatile memory configured by eMMC, for example. The eMMC is an abbreviation for Embedded Multi Media Card. The ROM 205 stores various programs to be executed by the CPU 204, data to be referred at the time of executing the programs, and various data such as setting information of the periphery device 4. Further, the ROM 205 is provided with a read-only area in which, for example, programs are stored, and a writable area in which, for example, data can be stored, and constitutes a storage of the vehicle device 2.

The RAM 206 includes a volatile memory and temporarily stores data such as calculation results. The data temporarily stored in the RAM 206 is stored in the writable area of the ROM 205 if necessary. At this time, writing to the ROM 205 can be performed at any timing, but can be performed at the timing when the data is updated or when the vehicle device 2 is powered off.

The input-output port 207 is a circuit for inputting and outputting signals between the controller 201 and the periphery device 4 or the external device 3. The communication circuit 208 corresponds to a USB system in the present embodiment, and transmits and receives data to and from the external device 3 via the communication line 5. Connection with the external device 3 is made via the USB connector 203.

The external device 3 is implemented, for example, as a semiconductor integrated circuit configured by SoC, and is configured as a USB module connected to the vehicle device 2 via USB in the present embodiment. The external device 3 is communicably connected to the controller 201 of the vehicle device 2 via the communication line 5, and can transmit and receive data to and from the vehicle device 2. In addition, access to the periphery device 4 and the ECU 6 or data communication with the ECU 6 is possible via the vehicle device 2. Further, the power supply of the external device 3 is possible from the vehicle device 2 via the communication line 5, that is, the USB cable.

The external device 3 includes an external controller 301 that executes functions implemented therein, and an external input-output circuit 302 that inputs and outputs various signals between the periphery device 4 and the like connected the external device 3. The external controller 301 includes a CPU 304, a ROM 305, a RAM 306, an input-output port 307 and a communication circuit 308, which are connected by a bus 309. Although in FIG. 1, the external input-output circuit 302 is shown as one block for simplification of explanation, the external input-output circuit 202 can include a plurality of circuits corresponding to the connected device.

The CPU 304 executes the programs stored in the ROM 305 to control the external device 3 and provide communication with the vehicle device 2 and various functions implemented therein. This CPU 304 can include one or more semiconductor devices. In the present embodiment, the external controller 301 employs the same controller as the controller 201 of the vehicle device 2. However, the external controller 301 may have higher processing performance than the controller 201 or may have lower processing performance than the controller 201.

The ROM 305 stores programs executed by the CPU 304 and data referred to when the programs are executed. This ROM 305 constitutes an external storage provided in the external device 3. Further, the external device 3 can store data transmitted from the vehicle device 2, and can transmit data stored by itself to the vehicle device 2.

The input-output port 307 is a circuit for inputting and outputting signals between the external controller 301 and other devices. In the present embodiment, the assumed other devices include the vehicle device 2, the periphery device 4 and the ECU 6 connected to the vehicle device 2, an external communication circuit 310 for communicating with an external terminal 7 of a user, and the like.

The communication circuit 308 conforms to the USB standard for communicating with the vehicle device 2 in the present embodiment. The external communication circuit 310 uses a Wi-Fi communication circuit 310*a* that performs communication using, for example, Wi-Fi (registered trademark), a BT communication circuit 310*b* that performs communication using Bluetooth (registered trademark), a mobile object communication circuit 310*c* that performs communication using a wide area network such as a telephone line network, and the like. In the present embodiment, the communication with the external terminal 7 is performed by the BT communication circuit 310*b*. However, the external communication circuit 310 does not necessarily have to be equipped with the plurality of methods described above, and may have a configuration of other methods such as communication using a wired connection method, for example.

The periphery devices 4 are assumed to include, for example, a center display 4*a*, a meter display 4*b*, a head-up display 4*c*, a speaker 4*d*, a camera 4*e*, a position detector 4*f*, a tuner 4*g*, a DSM 4*h*, and a LIDAR 4*i*. However, the types and numbers of the periphery devices 4 shown in FIG. 1 are only examples, and the vehicle device 2 does not necessarily have to be connected to all of them, and may be connected to other periphery devices 4 that are not illustrated.

The center display 4*a* is arranged, for example, in front between a driver seat and a passenger seat. The center display 4*a* is used, for example, as a display screen when a navigation function is executed or as an operation screen when a touch panel (not shown) provided corresponding to the display area is used. That is, the center display 4*a* also functions as an input unit for inputting user operations.

However, as the input unit, a device other than the touch panel, for example, mechanical operation switches (not shown) may be arranged around the screen to input operations. Further, as the input unit, other displays or steering switches (not shown) can be adopted, or they can be used in common with a touch panel or operation switches.

The meter display 4*b* is arranged in front of the steering wheel, and displays a meter such as speed and rotation speed, and displays such as a warning light. The head-up display 4*c* displays various types of information on a windshield placed in front of the driver or a display board placed on a dashboard.

The speaker 4*d* is installed inside the vehicle and outputs sound based on audio data output from the vehicle device 2 or the external device 3. The speaker 4*d* is used, for example, for warning from the vehicle device 2 or the external device 3, operation guidance, or reproduction of music. Further, the speaker 4*d* can be used to output sound from the external terminal 7.

The position detector 4*f* includes a GPS receiver and a gyro sensor (not shown), and acquires the current position and orientation of the vehicle. The GPS is an abbreviation for global positioning system. The GPS receiver receives GPS positioning signals transmitted from GPS satellites and outputs the received GPS positioning signals. The gyro sensor detects an angular velocity of rotation about an X-axis, a Y-axis, and a Z-axis orthogonal to one another.

The camera 4*e* is attached to, for example, a rear side of the vehicle, and continuously images a situation behind the vehicle. The image captured by the camera 4*e* is displayed on the center display 4*a* or other displays together with, for example, detection results of objects present in an image and guidance lines for guiding the vehicle. The tuner 4*g* receives radio broadcast signals of AM broadcast and FM broadcast. Further, a tuner for receiving television broadcasting can be provided as the tuner 4*g*.

The DSM 4*h* is a driver status monitor that includes an imaging device and the like, and detects a driver condition by image analysis of a face image obtained by capturing the driver face. The DSM is an abbreviation for Driver Status Monitor. The LIDAR 4*i* detects a position of an object present in the periphery of the vehicle by transmitting and receiving laser light. The LIDAR is an abbreviation for Light Detection and Ranging.

The ECU 6 is an electronic device mounted on the vehicle. A plurality of ECUs 6 are installed in general vehicles. The vehicle device 2 acquires various types of information about the vehicle, such as a drive state of drive units such as an engine and a motor, and an open-close state of doors, from these ECUs 6. Although one ECU 6 is shown in FIG. 1 for simplification of explanation, the vehicle device 2 is communicably connected to a plurality of ECUs 6 via the vehicle interior network 6*a*.

The ECU 6 has an external input-output circuit for communicating with an ECU controller 601 that executes functions mounted therein, and an external input-output circuit 602 for communicating with the vehicle device 2, another ECU 6, an in-vehicle device 10 such as sensor connected to itself. The ECU controller 601 has a CPU 604, a ROM 605, a RAM 606 and an input-output port 607, which are connected by a bus 609. Although in FIG. 1, the external input-output circuit 602 is shown as one block for simplification of explanation, the external input-output circuit 202 can include a plurality of circuits corresponding to the connected device.

The CPU 604 executes the programs stored in the ROM 605 to control the ECU 6 and provide communication with the vehicle device 2 and various functions implemented therein. This CPU 604 can include one or more semiconductor devices. The ROM 605 stores programs executed by the CPU 604 and data referred to when the programs are executed. The ROM 605 constitutes an ECU storage provided in the ECU 6.

The input-output port 607 is a circuit for inputting and outputting signals between the ECU controller 601 and other devices. In the present embodiment, as other devices, the vehicle device 2, the external device 3 connected to the vehicle device 2, and the external terminal 7 connected to the external device 3, and the like are assumed. The ECU 6 can transmit and receive data in response to a request from devices of the vehicle device 2.

The external terminal 7 is assumed to be, for example, a so-called smart phone or tablet terminal. However, as will be described later, the external device 3 can be taken out of the vehicle and used. Therefore, in such a case, for example, a personal computer or the like is also assumed as the external terminal 7.

Figure 2:
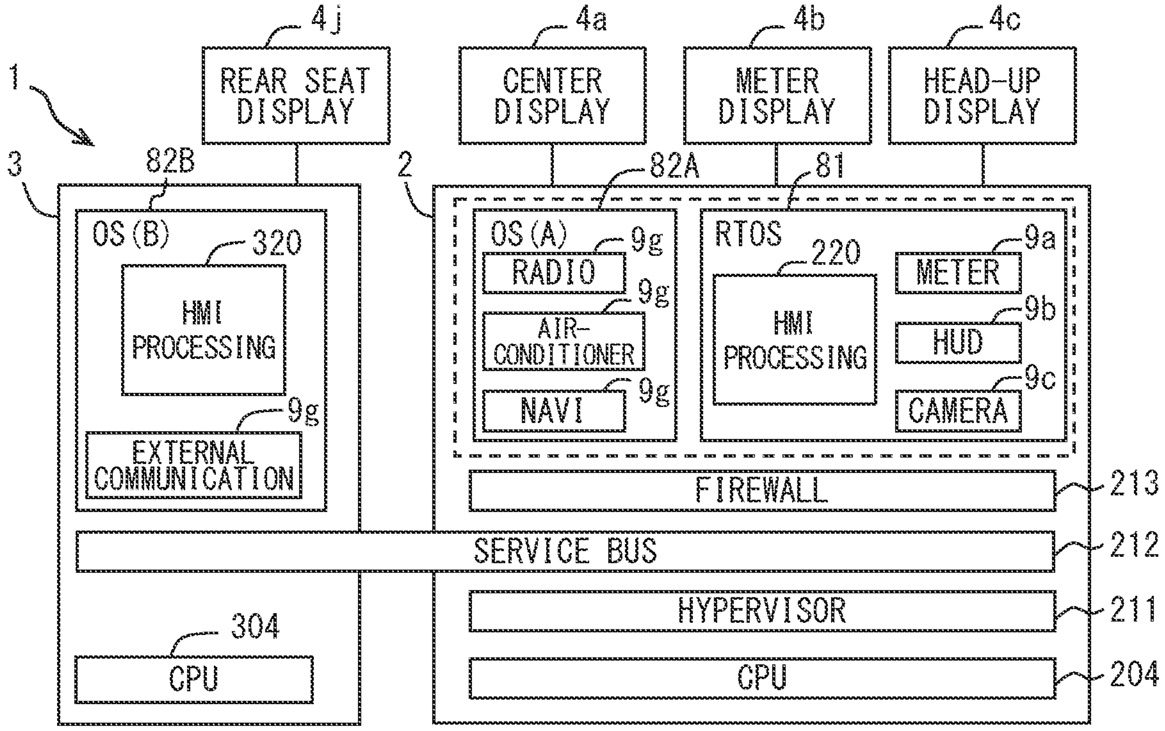
FIG. 2 is a diagram schematically showing a configuration example of software of the vehicle system.

Next, a basic software configuration of the vehicle system 1 will be described. As shown in FIG. 2, in the vehicle system 1, an operating system is installed in the vehicle device 2 and the external device 3, respectively. Hereinafter, an operating system will be referred to as an OS 8. The OS is an abbreviation for Operating System. Further, in FIG. 2, some periphery devices 4 are not shown for simplification of explanation, and some of the applications 9 that implement the functions that can be provided by each OS 8 are extracted and exemplified. However, the applications 9 included in the vehicle device 2 and the external device 3 are not limited to those shown in FIG. 2. Hereinafter, the application 9 is also simply referred to as an application.

A hypervisor 211, a service bus 212, a firewall 213, an RTOS 81 and an MMOS 82A are mounted in the controller 201 of the vehicle device 2. The RTOS is an abbreviation for Real Time OS, and MMOS is an abbreviation for Multi Media OS.

That is, in the case of the present embodiment, a virtual environment in which the plurality of OSs 8 can operate is built in the vehicle device 2. However, in the present embodiment, the MMOS 82 is mounted on each of the vehicle device 2 and the external device 3. Therefore, in order to make it easier to distinguish between them, the MMOS 82 mounted in the vehicle device 2 is denoted by A, and the MMOS 82 mounted in the external device 3 is denoted by B. Also, when describing items common to the RTOS 81 and the MMOS 82, they may simply be referred to as the OS 8. In addition, when items common to the MMOS 82A and the MMOS 82B are described, the MMOS 82A and the MMOS 82B may be also referred to as the MMOS 82.

Since the hypervisor 211 is a general technology, detailed description is omitted. The hypervisor 211 is a program for enabling multiple OSs 8 such as the RTOS 81 and the MMOS 82A to be executed in parallel on the controller 201. The hypervisor has a function of managing each OS 8, a function of assisting communication between each OS 8, and the like. However, the hypervisor 211 can also be implemented as part of the functions of the RTOS 81, for example.

The service bus 212 is a program for exchanging data between the application layer of each OS 8 and a lower layer indicating any layer below the application layer. This service bus 212 includes a database for associating data for the lower layer with data for the application layer in order to implement data communication as if the vehicle device 2 and the external device 3 were one device.

In addition, the service bus 212 converts a data format between the application layer and the lower layer by referring to the database, and enables data exchange between the RTOS 81 and the MMOS 82A within the vehicle device 2, and between the vehicle device 2 and the external device 3.

The firewall 213 has a function of restricting unauthorized access between the OSs 8 and unauthorized access to the RTOS 81 and the MMOS 82A from the outside. It should be noted that whether to install the firewall 213 may be selected as appropriate. When security can be ensured by another method, the firewall 213 may not be installed.

The RTOS 81 is suitable for executing processes that require real-time performance, and mainly executes processes related to vehicle control and safety. A HMI processing unit 220 is mounted on this RTOS 81. The HMI processing unit 220 executes processes related to display control on the center display 4*a*, the meter display 4*b*, or the head-up display 4*c* based on data input from the periphery device 4 or another application 9. Further, the HMI processing unit 220 executes processes such as creation of image data using a GPU (not shown) in accordance with instructions from the application 9, commands for image creation, and the like. The HMI is an abbreviation for Human Machine Interface, and the GPU is an abbreviation for Graphics Processing Unit.

Further, the RTOS 81 executes various processes such as display output and audio output. Therefore, the RTOS 81 is equipped with applications 9 such as, for example, a meter application 9*a*, a HUD application 9*b*, and a camera application 9*c*, each of which provides a function. The HUD is an abbreviation for Head Up Display.

The meter application 9*a* performs calculations for an instruction or generation of an image such as, for example, a speedometer or a warning light to be displayed on the meter display 4*b*, or performs calculations for generation of a necessary image. That is, the meter application 9*a* of the present embodiment does not directly access the meter display 4*b*, but rather causes the HMI processing unit 220 to display an image on the meter display 4*b*.

The HUD application 9*b* implements a function for controlling display on the head-up display 4*c*. This HUD application 9*b* performs calculations for generating the instruction for generating the image and the necessary image. This HUD application 9*b* causes the HMI processing unit 220 to display the actual image on the head-up display 4*c*.

The camera application 9*c* is used for implementing a function of controlling display of an image captured by the camera 4*e*. The camera application 9*c* executes processes of detecting objects existing in the image, calculation of guidance lines when the vehicle backs up, and the like. This camera application 9*c* performs calculations for generating the instruction for generating the image and the necessary image. This camera application 9*c* causes the HMI processing unit 220 to display the image on the center display 4*a*, perform the composition of the captured image and the guidance lines, and the like.

The MMOS 82A is a general-purpose device that is used in, for example, a general external terminal 7, and is suitable for executing multimedia processing. In the present embodiment, Android (registered trademark) is adopted as the MMOS 82. Further, the MMOS 82A and MMOS 82B are assumed to have the same version or sufficiently compatible versions.

For example, the radio application 9*d*, the air conditioner application 9*e*, the navigation application 9*f*, and the like are mounted on this MMOS 82A, and each provides a function. The radio application 9*d* outputs sound to the speaker 4*d* based on radio broadcast signals and television broadcast signals received by the tuner 4*g*. The air conditioner application 9*e* controls an air conditioner mounted on the vehicle. The navigation application 9*f* provides a so-called navigation function by displaying the current location of the vehicle and performing calculations for guiding the route from the current position to the destination based on the position information detected by the position detector 4*f* and the like.

These functions implemented in the vehicle device 2 in the present embodiment are functions that are used even when the product is changed. In other words, the vehicle device 2 mainly has common functions (first functions) regardless of the type of product. However, the types and number of functions illustrated here are examples, and the functions implemented in the vehicle device 2 are not limited to these.

On the other hand, the HMI processing unit 320 and the external communication application 9*g* are mounted on the MMOS 82B of the external device 3. The HMI processing unit 320 executes processes related to display control, like the HMI processing unit 220 of the vehicle device 2. At this time, the HMI processing unit 320 executes processes related to display on a rear seat display 4*j*, which is the periphery device 4 connected to the external device 3. Further, the external communication application 9*g* executes processes related to communication with the external terminal 7. That is, the vehicle system 1 has functions that are not provided in the vehicle device 2, in other words, functions that differ depending on the type of product. However, the type and the number of functions illustrated here are examples, and the functions implemented in the external device 3 are not limited to these.

Next, operations and effects of the above-described configuration will be described.

Figure 3:
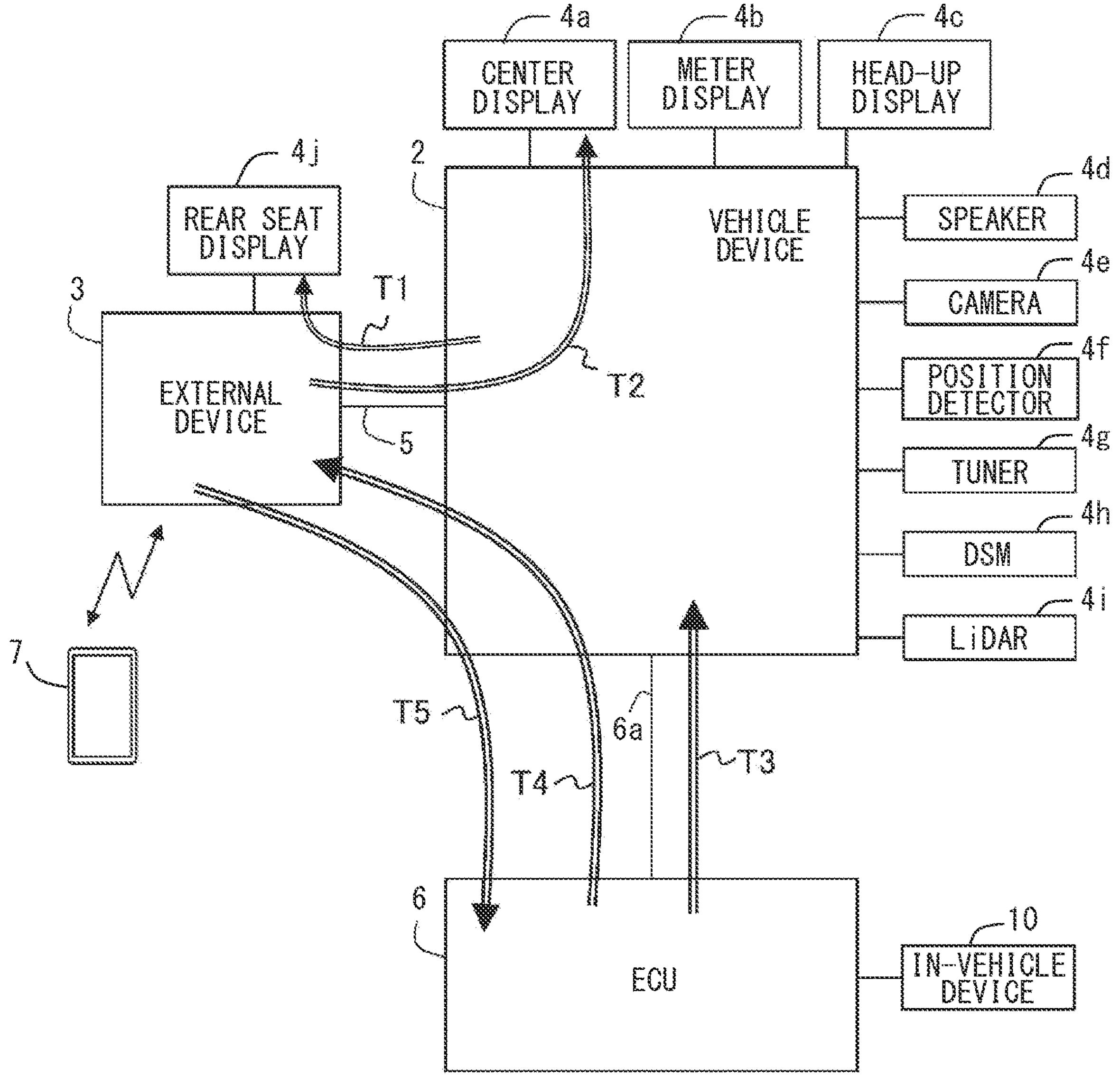
FIG. 3 is a diagram schematically showing a route through which data is transmitted and received.

First, the vehicle system 1 can perform communication between devices as described above. For example, as indicated by an arrow T1 in FIG. 3, the vehicle system 1 can seamlessly display information on the rear seat display 4*j* via the vehicle device 2 and the external device 3. That is, the vehicle system 1 is configured such that the functions (second functions) installed on devices of the external device 3 can be used from the vehicle device 2.

Further, as indicated by an arrow T2, the vehicle system 1 can seamlessly display information on the center display 4*a* via the external device 3 and the vehicle device 2. That is, the vehicle system 1 is configured so that the functions installed on devices of the vehicle device 2*e* can be used from devices of the external device 3. The devices of the external device 3 may include the external device 3 and the external terminal 7.

In this case, directly from the vehicle device 2, the display is performed on the rear seat display 4*j*, or display from the external device 3, the display may be performed on the center display 4*a*. However, it is also possible to transfer the data to be displayed to the other device and control the display on the other device. That is, the vehicle system 1 can transfer some of the processes of the vehicle device 2 to the external device 3 or transfer some of the processes of the external device 3 to the vehicle device 2, for example.

Alternatively, the vehicle system 1 can transmit data collected by the ECU 6 from the in-vehicle device 10 to the vehicle device 2 and use the data in the vehicle device 2, as indicated by an arrow T3. As indicated by an arrow T4, the vehicle system 1 can transmit the data to the external device 3 via the vehicle device 2, and the data can be used by the external device 3. As indicated by an arrow T5, the vehicle system 1 can transmit the data of the external terminal 7 to the ECU 6 via the external device 3, the data can be used by the ECU 6. That is, the vehicle system 1 can use the functions implemented in the ECU 6 from the external device 3 via the vehicle device 2 and can use the functions implemented in itself from the ECU 6.

In the above, one utilization embodiment of the vehicle system 1 has been described. However, as described above, the functions required of the vehicle system 1 may differ depending on the type of product. For example, even when the vehicle devices 2 are in the same product group and are made by the same manufacturer, there are cases where, for example, the relatively expensive product has more number and types of functions Further, it is assumed that the vehicle device 2 requires different hardware configuration and software configuration depending on the type and number of the periphery devices 4 mounted on the vehicle.

Conventionally, a plurality of types of vehicle devices 2 have been individually developed and designed according to their specifications and required hardware and software configurations. However, in that case, it is necessary to develop hardware and software for each type of vehicle device 2. A great deal of resources in terms of cost and manpower are required. Further, even when extensibility is provided in advance, the addition or expansion of functions after shipment requires work by dealers or manufacturers. Further, preparing high-performance hardware in advance in anticipation of future expandability is not preferable mainly in terms of cost.

Figure 4:
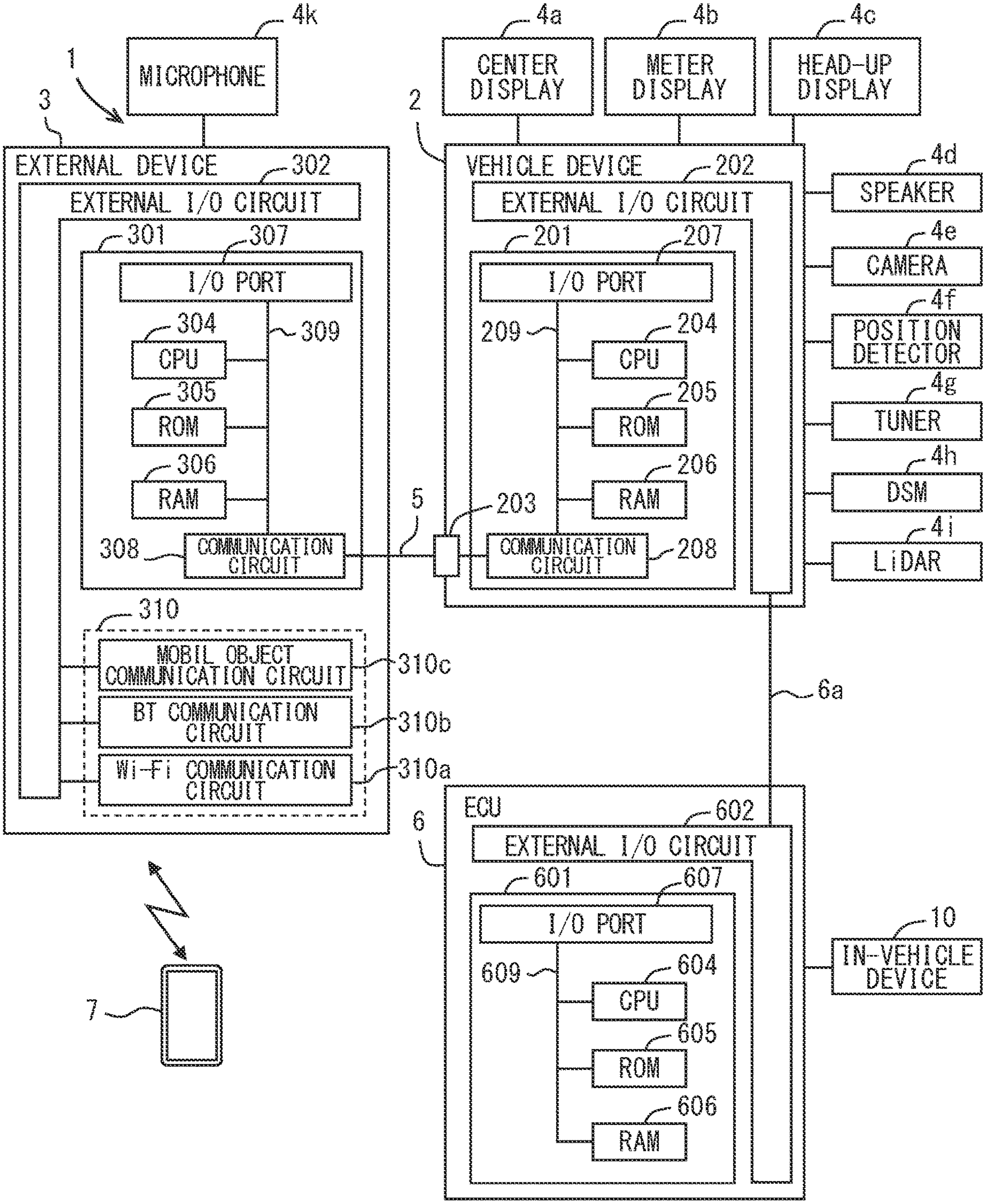
FIG. 4 is a diagram schematically showing another hardware configuration example of the vehicle system.

Therefore, according to the vehicle system 1, it is possible to reduce resources and perform development and design even for products with different required functions, and easily expand functions according to the type of product and the vehicle in which the product is installed. First, as described above, FIG. 1 shows one configuration example of the vehicle system 1, and it is assumed to be used for the vehicle having the rear seat display 4*j*. FIG. 4 shows a configuration example of the vehicle system 1 used for a vehicle that does not include the rear seat display 4*j* but includes a microphone 4*k* for inputting voice.

Figure 5:
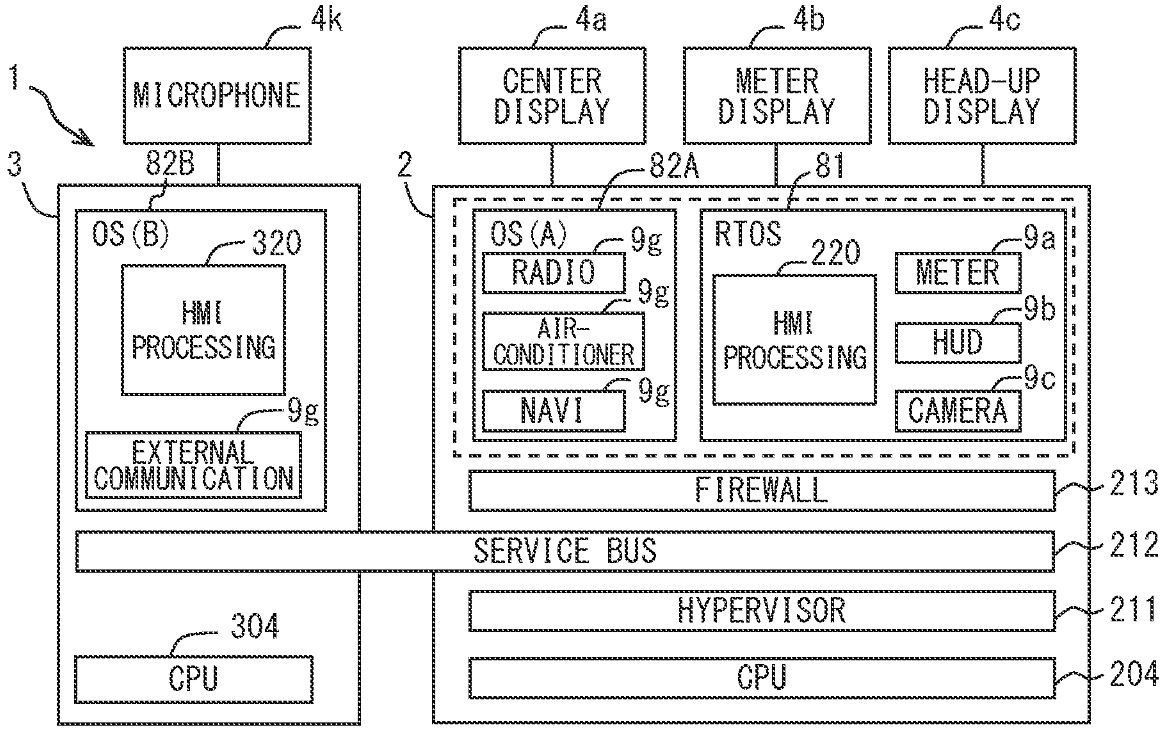
FIG. 5 is a diagram schematically showing another software configuration example of the vehicle system.

FIG. 5 shows a software configuration example of the vehicle system 1 shown in FIG. 4.

As clearly shown by the comparison of the configuration example of FIG. 1 with the configuration example of FIG. 4, in the vehicle system 1, the hardware configuration of the vehicle device 2 is common regardless of whether the periphery device 4 connected to the external device 3 is the rear seat display 4*j* or the microphone 4*k*. Further, as clearly shown by the comparison of the configuration example of FIG. 2 with the configuration example of FIG. 5, the software configuration of the vehicle device 2 is common regardless of whether the periphery device 4 connected to the external device 3 is the rear seat display 4*j* or the microphone 4*k*. In FIG. 5, it is assumed that the HMI processing unit 320 executes processes related to voice input, but the application 9 for voice processing can also be installed.

That is, in the vehicle system 1, the vehicle device 2 can basically have the same hardware configuration and the same software configuration even when the types and numbers of the periphery devices 4 are different. Thereby, the vehicle device 2 can be developed and designed using the same hardware. The external device 3 has a different software configuration depending on, for example, the periphery device 4 mounted on the vehicle. The hardware configuration of the external device 3 can be changed according to the type and number of periphery devices 4.

That is, in the vehicle system 1, the functions common to the product type are installed in the vehicle device 2, and the functions different depending on the product type are installed in the external device 3. Thereby, the vehicle device 2 can be developed and designed with a configuration that provides common functions, that is, can be developed and designed using common hardware regardless of the type of product.

The vehicle device 2 and the external device 3 are connected by the USB cable in the present embodiment. Therefore, the vehicle device 2 and the external device 3 can be easily connected. In other words, it is possible to easily add different functions and extend the functions of the vehicle device 2 depending on the type of product. Further, it is possible to easily perform the work even when, after the shipment, the function is added or expanded.

Accordingly, it is possible to provide the vehicle system 1 capable of developing and designing products while reducing resources even in a case where the products have different functions, and capable of easily expanding the functions.

Further, in the vehicle system 1, the functions installed on devices of the external device 3 can be used from the vehicle device 2. Thereby, functions that the vehicle device 2 does not have can be seamlessly controlled mainly by the vehicle device 2. That is, the vehicle device 2 becomes a main controller for the functions.

Further, the vehicle system 1 is configured so that the functions installed on devices of the vehicle device 2*e* can be used from devices of the external device 3. Thereby, functions that the external device 3 does not have can be seamlessly controlled mainly by the external device 3. That is, the external device 3 becomes a main controller for the functions.

Further, the vehicle system 1 can use the functions implemented in the ECU 6 from the external device 3 via the vehicle device 2 and can use the functions implemented in itself from the ECU 6. Thereby, it is possible to effectively use resources of each device.

Figure 6:
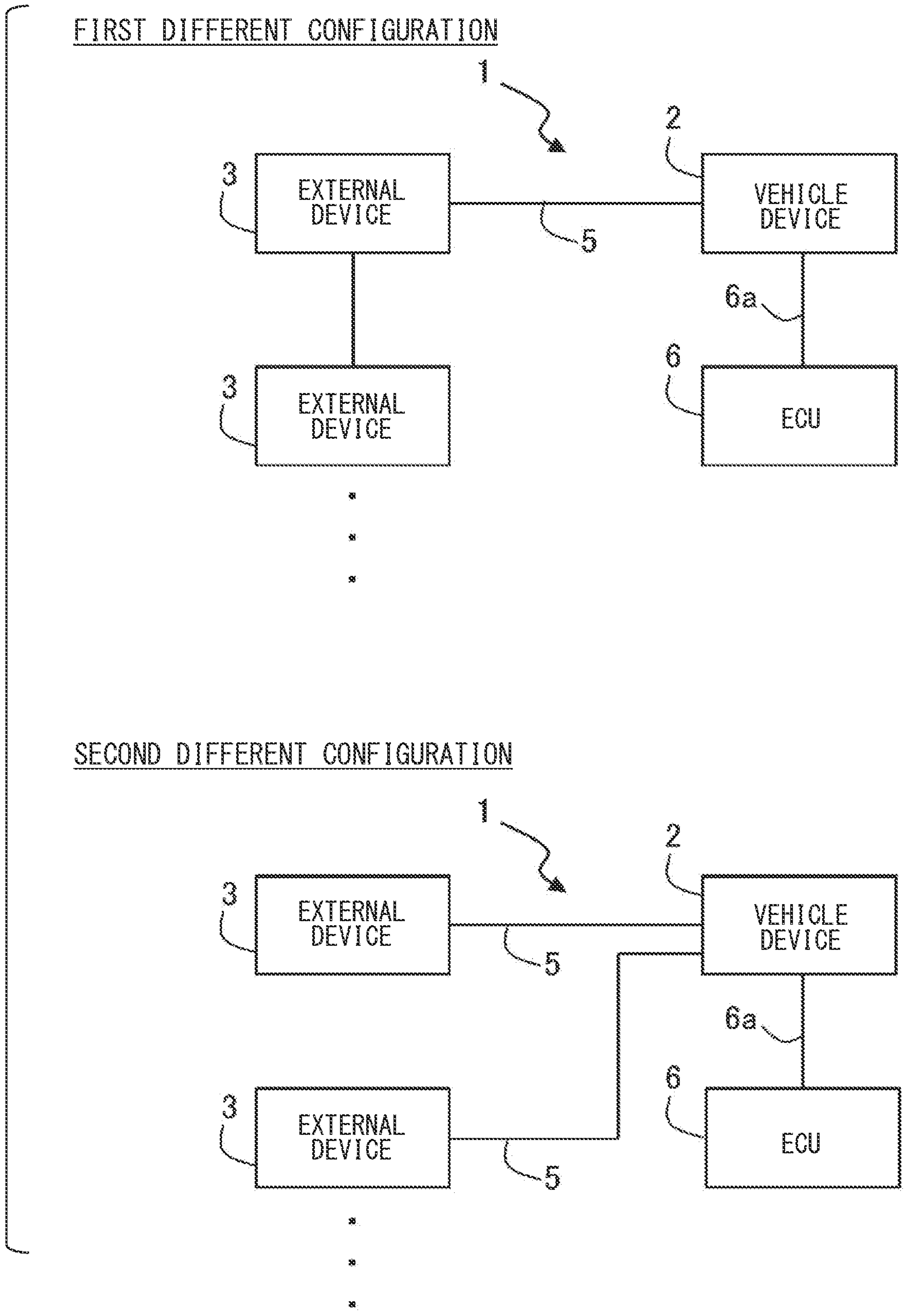
FIG. 6 is a diagram schematically showing different connection examples of the vehicle system.

Further, the vehicle system 1 can connect the vehicle device 2 and the plurality of external devices 3, as shown in FIG. 6. In this case, as shown in FIG. 6, in a first different configuration example, the external device 3 connected to the vehicle device 2 is further connected to another external device 3 in a daisy chain method. Thereby, the plurality of external devices 3 can be connected. In this case, the functions can be easily expanded by connecting the external devices 3 with, for example, the USB cable.

Alternatively, as shown as a second different configuration example, the vehicle system 1 may have a configuration in which the plurality of external devices 3 are connected to the vehicle device 2. In this case, for example, the vehicle device 2 is provided with a plurality of USB ports, and each external device 3 is connected with the USB cable. Thereby, it is possible to easily extend the function. Further, the connection with the vehicle device 2 and the connection with the external devices 3 can be implemented by other wired methods or wireless methods. At this time, it is possible to more easily expand the functions by connection using a wireless communication method.

Further, the external device 3 can have the function of which update is assumed to be necessary after the product shipment, or the function of which update frequency is relatively high compared to the function of the vehicle device 2. In this case, both OS 8 and application 9 are included as functions. For example, the Android OS, which is used as the OS 8 on devices of the external device 3 in the present embodiment, is considered to be updated with a much higher frequency than the product life of the vehicle device 2. Further, it is considered that, when the version of the OS 8 is upgraded, the application 9 may need to be updated, and when the application 9 is to be upgraded, the OS 8 may need to be updated.

Therefore, by concentrating these functions in the external device 3, it is possible to update the OS 8 and the application 9 even after the product shipment. Further, it becomes possible to update the external device 3 itself, and easily perform the work of updating and the like. Further, since devices of the vehicle device 2 basically do not need to be updated, it is possible to prevent the vehicle device 2, which is assumed to be in charge of processing related to safety, for example, from being affected.

Further, although an example in which the hypervisor 211 is installed independently from each OS 8 and each OS 8 is operated on the hypervisor 211 has been shown, other configurations are possible. For example, in a case where the RTOS 81 has the function of the hypervisor 211, the RTOS 81 may be activated first to enable the function of the hypervisor 211, and then the MMOS 82A may be executed on the RTOS 81.

Although a software configuration example in which multiple OSs 8 are installed in the vehicle device 2 and one OS 8 is installed in the external device 3, other software configurations are possible. For example, one RTOS 81 may be installed in the vehicle device 2 and a plurality of OSs 8 may be installed in the external device 3.

Second Embodiment

Hereinafter, a second embodiment will be described. The second embodiment shows a specific utilization embodiment of the vehicle system 1. An example, in which mainly data of devices of the external device 3 is used by devices of the vehicle device 2, will be described. Further, since the basic hardware and software configurations of the vehicle system 1 are generally the same as those of the first embodiment except for a partial configuration of the external device 3, the description will be made with reference to FIGS. 1 to 6 as well.

The supply from the main power source to the vehicle device 2 is turned off when the vehicle is in a non-driving state with no occupants. Therefore, destination setting data used by the vehicle device 2 during the navigation, data for the control, or control system data such as a vehicle speed, the remaining amount of fuel, or the battery status acquired from the ECU 6 is necessary for operating the vehicle device 2 by turning on an engine key or operating a start switch.

In other words, it is basically necessary to perform the operation near the vehicle device 2 in order to make some settings of devices of the vehicle device 2 or to receive some data from devices of the vehicle device 2. The devices of the vehicle device 2 include the vehicle device 2 and the periphery device 4 and the ECU 6 connected to the vehicle device 2.

Therefore, the vehicle system 1 of the present embodiment enables settings of devices of the vehicle device 2 and data transfer to devices of the vehicle device 2 in advance or from a remote location without the occupant getting on the vehicle. Specifically, as described in the first embodiment, the external device 3 of the vehicle system 1 can transmit and receive data to and from the external terminal 7 by being communicably connected to the external terminal 7. Further, the vehicle device 2, the external device 3, and the ECU 6, which constitute the vehicle system 1, are communicably connected to each other, so that data can be similarly transmitted and received.

In this embodiment, the external communication application 9*g* installed in the external device 3 executes processes related to communication with the external terminal 7. Together with the execution, the external communication application 9*g* executes processes of receiving data to be transferred to the vehicle device 2, the periphery device 4, or the ECU 6 from the external terminal 7 and of transferring the received data to the vehicle device 2, the periphery device 4, or the ECU 6.

In other words, the external device 3 is accessible from the external terminal 7 and, for example, data resulting from the access can be reflected in the vehicle device 2, the periphery device 4, or the ECU 6. Then, the data to be transferred is assumed to be destination data used for search at the external terminal 7 and used by the navigation application 9*f* of the vehicle device 2, music data that is stored in the external terminal 7 and output from the speaker 4*d* that is the periphery device 4, data of, for example, a seat position required to be transmitted to the ECU 6 that is the electronic control unit for changing the seat position or inclination as desired, or the like. However, the types and number of data to be transferred are not limited to these.

Figure 7:
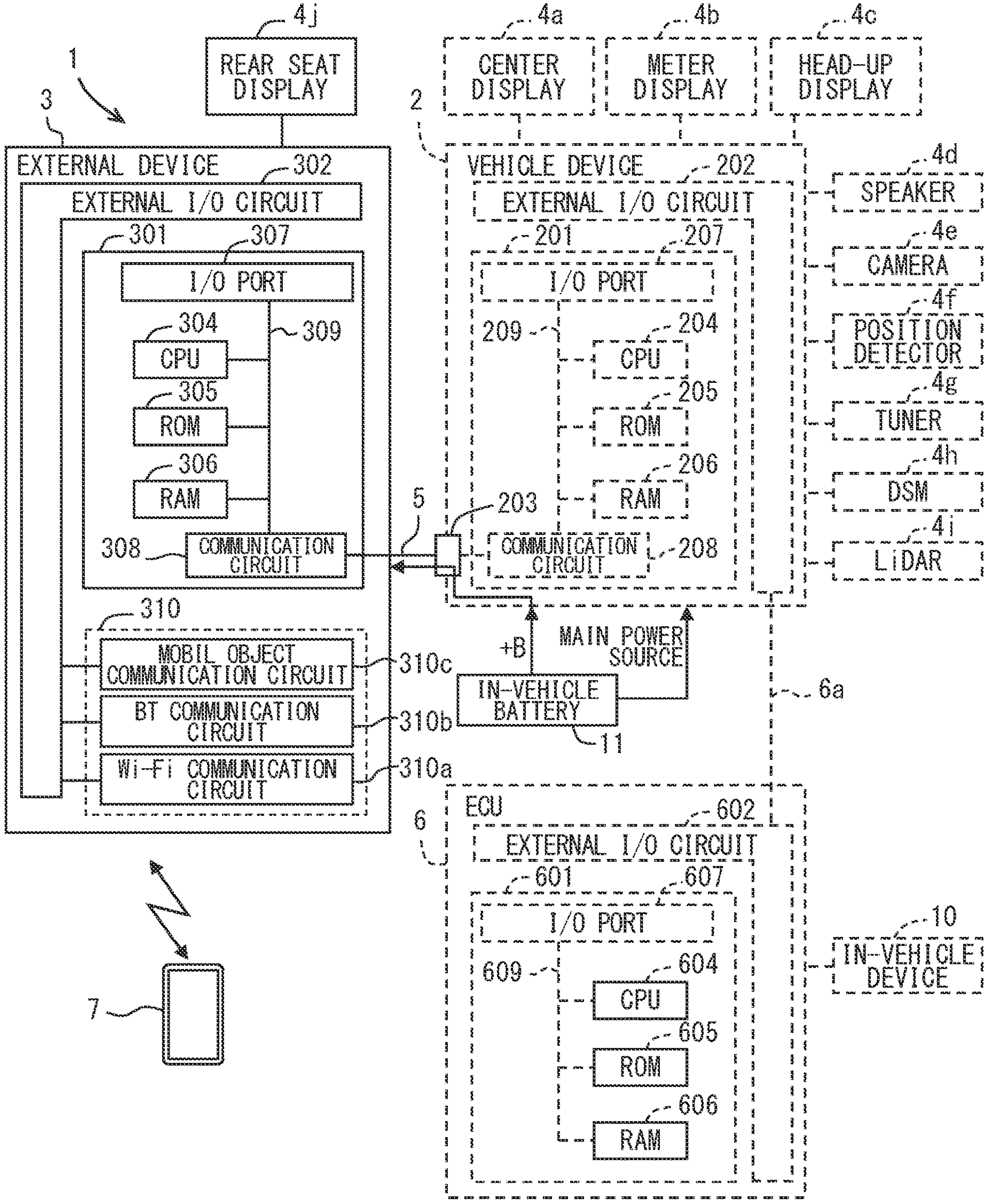
FIG. 7 is a diagram schematically showing a configuration example of a vehicle system according to a second embodiment.

At this time, as shown in FIG. 7, the external device 3 receives backup power supply from an in-vehicle battery 11 mounted on the vehicle via the vehicle device 2. In addition, in FIG. 7, the backup power supply is shown as +B. In this case, the power can be supplied by forming the communication line 5 with a cable capable of supplying power.

Figure 8:
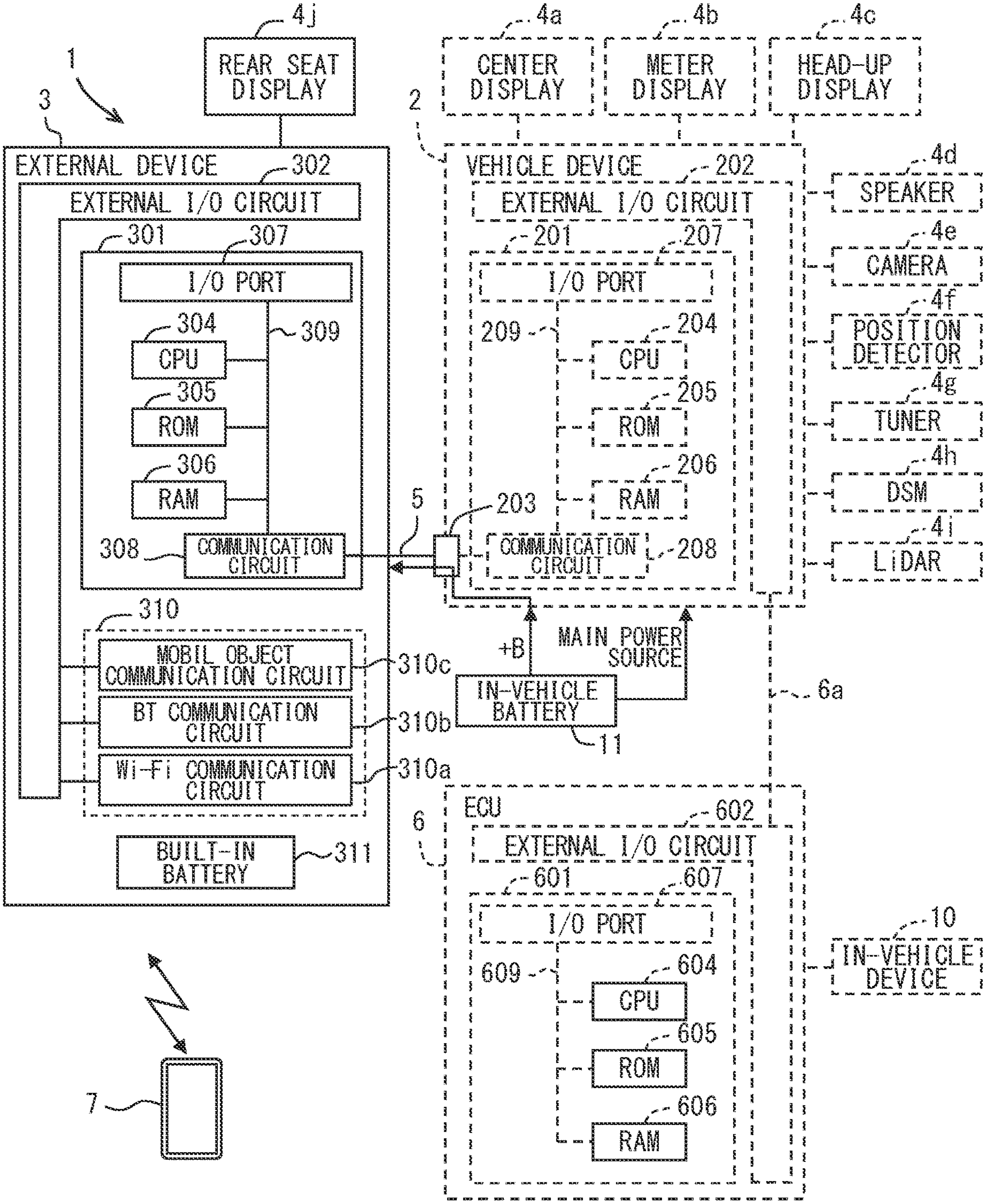
FIG. 8 is a diagram schematically showing another hardware configuration example of the vehicle system.

Alternatively, as shown in FIG. 8, by receiving the power supply from a built-in battery 311, the external device 3 can operate alone without being physically connected to the vehicle device 2. In this case, it becomes possible to take the external device 3 out of the vehicle. FIG. 8 schematically shows that the external device 3 is not connected to the vehicle device 2 by showing the vehicle device 2 with a dashed line.

Further, in FIG. 8, when the vehicle device 2 is connected, the power is supplied from the backup power source. When the vehicle device 2 is disconnected, the power is supplied from the built-in battery 311. Hereinafter, a configuration using both the in-vehicle battery 11 and the built-in battery 311 will be described below as an example. However, the external device 3 may receive the power supply from at least one of the in-vehicle battery 11 or the built-in battery 311. Further, the external device 3 may receive the power supply from another device such as the external terminal 7 to which the USB cable is connected, instead of from the in-vehicle battery 11.

In this case, it is possible to communicate with, for example, a smartphone outside the vehicle by using the BT communication circuit 310*b* for the communication with the external terminal 7 in order to reduce a power consumption, even when the backup power source is supplied from the in-vehicle battery 11. In FIG. 7, devices of the vehicle device 2 are indicated by the dashed lines to schematically show a state in which the vehicle device 2 is not operating.

The vehicle system 1 having such a configuration can communicate with the external terminal 7 even when the vehicle is stopped, and can set, for example, a destination from the external terminal 7. As a result of access from the external terminal 7, for example, data for setting and control are stored in a writable area of the ROM 305 of the external device 3.

At this time, the external device 3 can be operated by using the external terminal 7. Thereby, the operation such as setting can be performed from a smartphone or the like, which is assumed to be used by the user on a regular basis, instead of the vehicle device 2 that has a menu display and the like comparatively different for each manufacturer and requires an accustomed operation somewhat. Thereby, it is possible to improve the operability.

Figure 9:
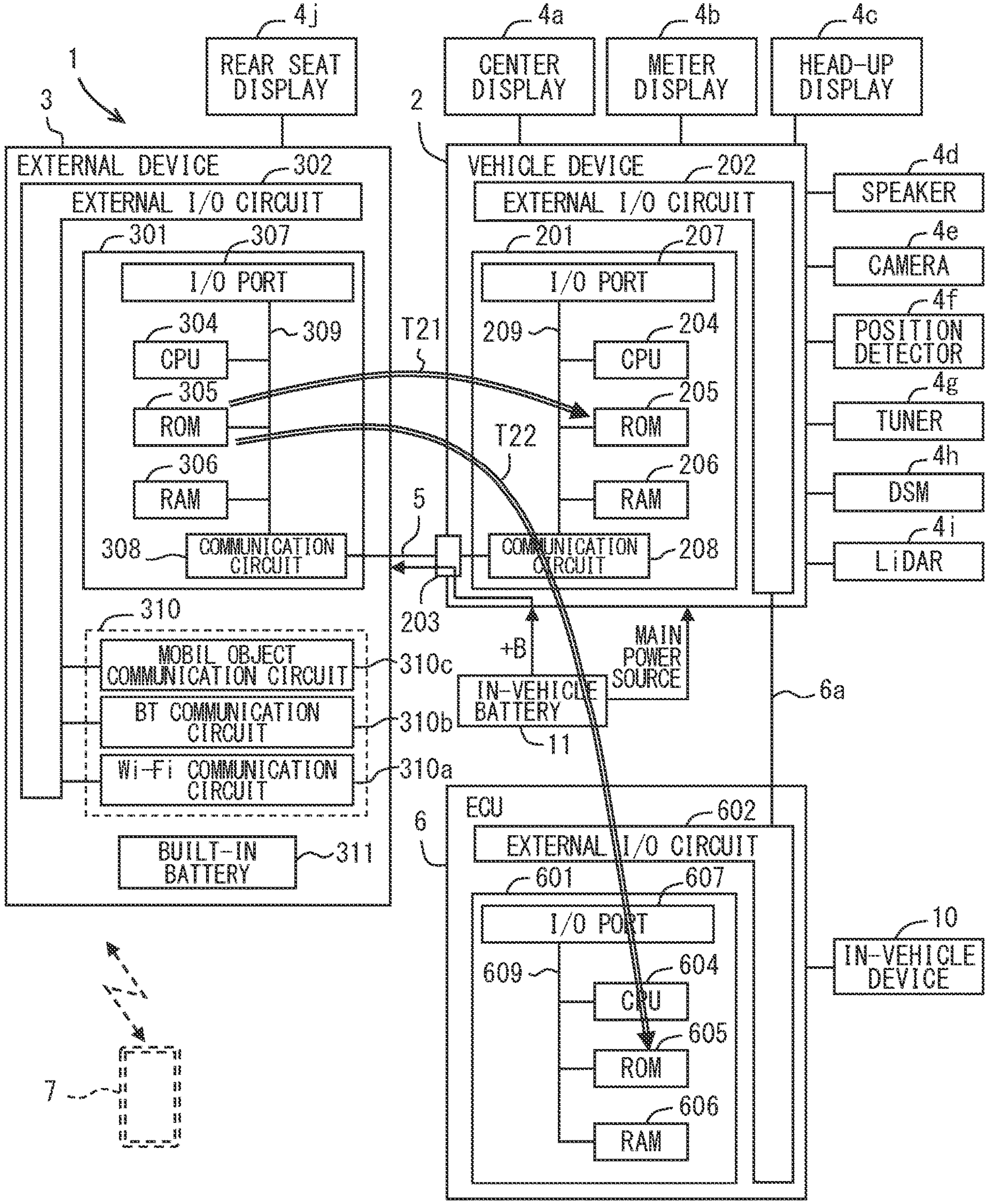
FIG. 9 is a diagram schematically showing a route through which data is transmitted and received.

Then, as shown in FIG. 9, when the vehicle system 1 is connected to the vehicle device 2, the stored data, that is, the access result from the external terminal 7 is transmitted to, in other words, reflected in the vehicle device 2 as indicated by an arrow T21 or the ECU 6 as indicated by an arrow T22. FIG. 9 schematically shows that the external terminal 7 is unnecessary when the access result is reflected by showing the external terminal 7 with a dashed line.

By adopting such a configuration, in the vehicle system 1, settings for devices of the vehicle device 2 can be performed at a time before the occupant boards the vehicle and performed by remote operation that does not need to be performed near the vehicle device 2. Further, since the remote operation is possible, for example, it is possible to perform settings by a person who is different from the person who actually gets on board.

As described above, the vehicle system 1 includes the vehicle device 2 and the external device 3 that can operate independently and is communicably connected to the vehicle device 2. The external device 3 can be accessed from the external terminal 7 and can reflect the result of the access to the vehicle device 2. Thereby, the vehicle system 1 can perform settings and the like of devices of the vehicle device 2 in advance or remotely without the person actually getting into the vehicle or operating the vehicle device 2.

Further, in the vehicle system 1, the external device 3 can access the functions installed in the vehicle device 2 from the external terminal 7. The access result from the external terminal 7 is reflected in devices of the vehicle device 2 when the vehicle device 2 is connected. Thereby, the settings is possible without direct operation to the vehicle device 2, and even a person unfamiliar with the operation of the vehicle device 2 can easily perform the settings.

In the vehicle system 1, the external device 3 can access the periphery device 4 connected to the vehicle device 2 from the external terminal 7. When connected to the vehicle device 2, the external device 3 reflects the access result from the external terminal 7 in devices of the vehicle device 2. Thereby, not only the vehicle device 2 but also the periphery device 4 can be set from the external terminal 7, so that even a person unfamiliar with the operation of the vehicle device 2 can easily perform the settings.

Further, in the vehicle system 1, the external device 3 can operate alone even when the vehicle device 2 is not operating or even when the external device 3 is not connected to the vehicle device 2. Thereby, even when the person does not get into the vehicle, or even where the person takes the device out of the vehicle, it is possible to remotely perform settings of devices of the vehicle device 2.

Further, in the vehicle system 1, the external device 3 is communicably connected to the external terminal 7 via a wired or wireless communication path. Thereby, it is possible to easily access the external device 3 from the external terminal 7.

Further, in the vehicle system 1, the external device 3 receives the power supply from the in-vehicle battery 11. Thereby, the external device 3 can operate alone. Thereby, the access from the external terminal 7 is possible even when the vehicle device 2 is not operating.

Further, in the vehicle system 1, the external device 3 can operate alone by receiving the power supply from the built-in battery 311 contained therein. Thereby, even when the vehicle device 2 is not connected and the external device 3 is taken out of the vehicle, the access from the external terminal 7 is possible.

Further, according to the vehicle system 1 of the present embodiment, it is possible to easily add different functions and extend the functions depending on the type of product. In addition, the vehicle device 2 and the external device 3 can be easily connected. Therefore, it is possible to obtain the same effects as in the first embodiment, such as the effect of easily performing the work of adding or extending functions after shipment.

Third Embodiment

Hereinafter, a third embodiment will be described. The third embodiment shows another specific utilization embodiment of the vehicle system 1. An example, in which mainly data of devices of the vehicle device 2 is used by devices of the external device 3, will be described. Further, since the configuration of the vehicle system 1 is generally the same as that of the second embodiment, the basic hardware and software configurations will be described with reference to FIGS. 6 to 8 in addition to FIGS. 1 to 5.

The supply from the main power source to the vehicle device 2 is turned off when the vehicle is in a non-driving state with no occupants. Therefore, when, for example, data, which is stored in the vehicle device 2, of a monitoring result of the DSM **4*h*, data for the control, or the control system data such as a vehicle speed, the remaining amount of fuel, or the battery status acquired from the ECU 6 is required to be used outside, it is necessary for operating the vehicle device 2** by turning on the engine key or operating the start switch.

In other words, in order to acquire data from devices of the vehicle device 2, it was basically necessary to perform the operation near the vehicle device 2. The devices of the vehicle device 2 include the vehicle device 2 and the periphery device 4 and the ECU 6 connected to the vehicle device 2.

Therefore, in the vehicle system 1 of the present embodiment, it is possible to access, from the external device 3 or the external terminal 7, the data obtained from devices of the vehicle device 2 without the person getting into the vehicle, without starting the vehicle device 2, and with the remote operation.

Figure 10:
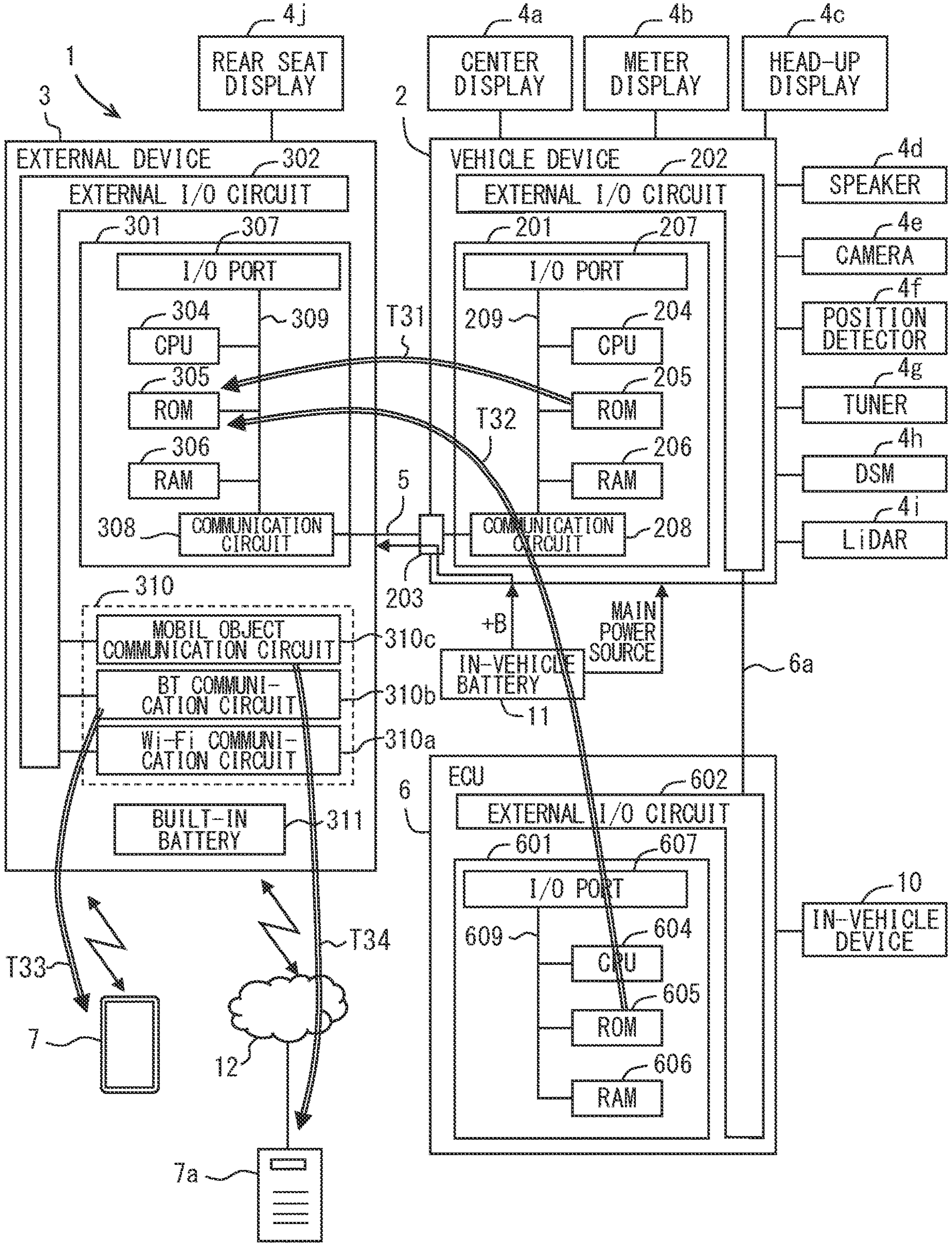
FIG. 10 is a diagram schematically showing a configuration example of a vehicle system according to a third embodiment.

In the vehicle system 1, as described in the first embodiment, the vehicle device 2, the external device 3, the periphery device 4, and the ECU 6 are communicably connected. Therefore, as shown in FIG. 10, in a state where the external device 3 is connected to the vehicle device 2, data stored in the vehicle device 2 as indicated by an allow T31 can be transmitted to the external device 3. Further, as indicated by an allow T32, the ECU 6 can transmit data collected from, for example, the in-vehicle device 10 to the external device 3.

At this time, transmission of data from devices of the vehicle device 2 to devices of the external device 3, that is, data download from the devices of the external device 3 is periodically performed at a predetermined cycle while the vehicle device 2 is operating, or performed at arbitrary timing when the data is changed, when data to be notified to the outside is generated in a case where an abnormality occurs in the travel data or the like.

The external device 3 can also transmit and receive data to and from the external terminal 7. That is, the external device 3 allows the external terminal 7 to access the data received from the devices of the vehicle device 2. Therefore, as indicated by an arrow T33, for example, the BT communication circuit 310*b* can transmit data from the external device 3 to the external terminal 7 such as a smartphone owned by the user. As indicated by an arrow T34, the mobile communication circuit 310*c* can transmit data to the external terminal 7*a* configured using, for example, a cloud server or storage via the wide area network 12.

At this time, when the data is downloaded via the mobile communication circuit 310*c*, the download can be performed even while the vehicle is traveling. The state of the occupant, especially the driver, and the state of the vehicle can be obtained in real time. However, the type and number of data to be downloaded by the external terminal 7 are not limited to this, and necessary data can be selected as appropriate. Further, the external terminal 7*a* is not limited to a cloud server or storage, and may be a mobile terminal, personal computer, or the like owned by the user. Hereinafter, they are collectively referred to as the external terminal 7.

Figure 11:
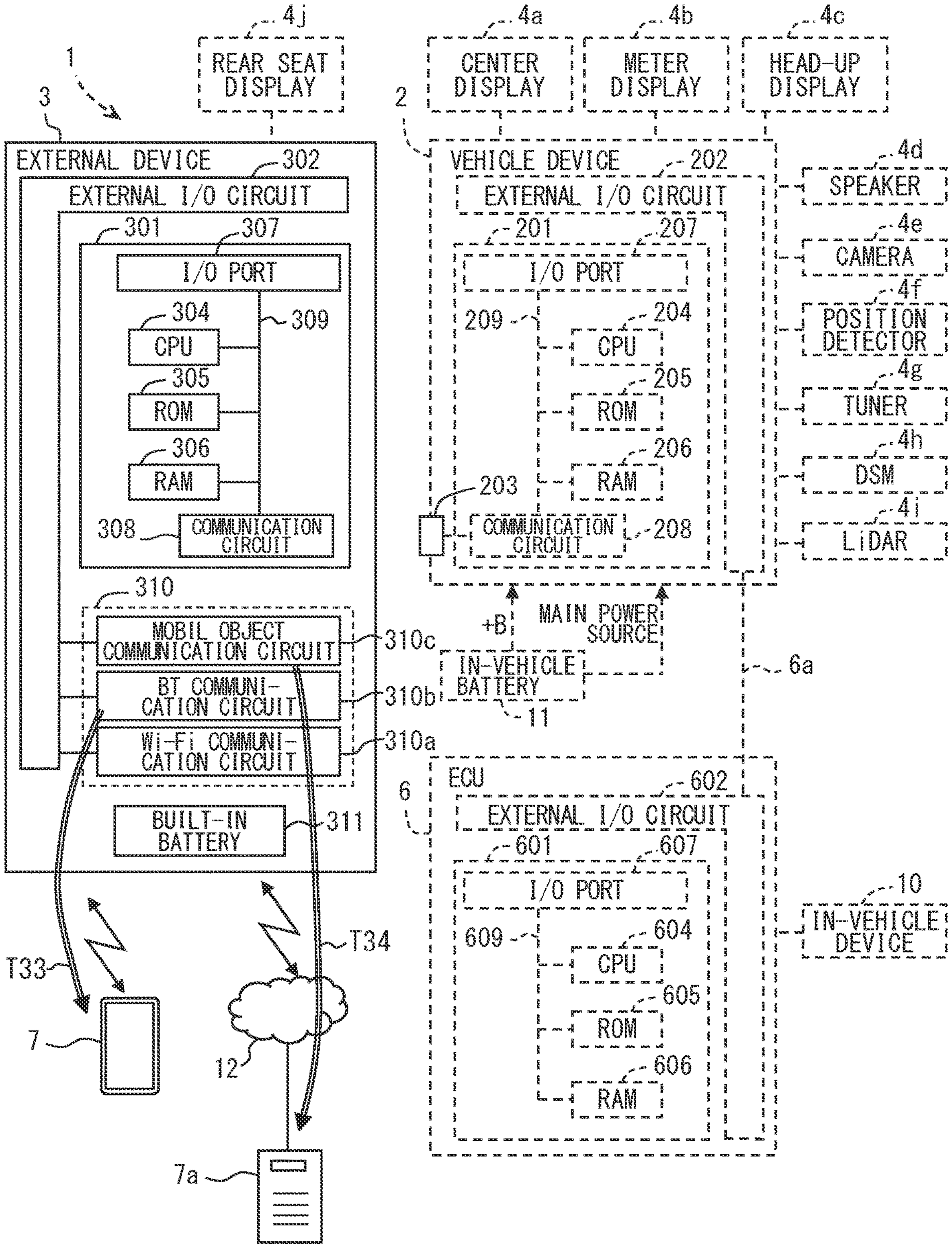
FIG. 11 is a diagram schematically showing a route through which data is transmitted and received.

Further, as described in the second embodiment and as shown in FIG. 11, the external device 3 can operate alone, even when the vehicle device 2 is not operating or when the connection with the devices of the vehicle device 2 is released. FIG. 11 schematically shows a disconnected state and a state in which the vehicle device 2 is not operating by showing the devices of the vehicle device 2 with a dashed line.

Then, by communicating between the external device 3, which can operate alone, and the external terminal 7, the external terminal 7 can collect above-described various data stored in the external device 3 even when the vehicle device 2 is powered off or when the external device 3 is taken out of the vehicle. Further, the data can be used by the external device 3 alone without transmitting the data to the external terminal 7.

As described above, the vehicle system 1 includes the vehicle device 2 and the external device 3 that can operate independently and is communicably connected to the vehicle device 2. The external device 3 receives the data from the devices of the vehicle device 2 and enables the external terminal 7 to access the received data.

Thereby, in the vehicle system 1 of the present embodiment, it is possible to access, from the external device 3 or the external terminal 7, the data obtained from devices of the vehicle device 2 without the person getting into the vehicle, without starting the vehicle device 2, and with the remote operation.

Further, in the vehicle system 1, the external device 3 can operate alone even when the vehicle device 2 is not operating or even when the external device 3 is not connected to the vehicle device 2. Thereby, even when the person does not get into the vehicle, or even where the person takes the device out of the vehicle, it is possible to remotely perform settings of devices of the vehicle device 2.

Further, in the vehicle system 1, the external device 3 is communicably connected to the external terminal 7 via a wired or wireless communication path. Thereby, it is possible to easily access the external device 3 from the external terminal 7.

Further, in the vehicle system 1, the external device 3 receives the power supply from the in-vehicle battery 11. Thereby, the external device 3 can operate alone. Thereby, the access from the external terminal 7 is possible even when the vehicle device 2 is not operating.

Further, in the vehicle system 1, the external device 3 can operate alone by receiving the power supply from the built-in battery 311 contained therein. Thereby, even when the vehicle device 2 is not connected and the external device 3 is taken out of the vehicle, the access from the external terminal 7 is possible.

Further, according to the vehicle system 1 of the present embodiment, it is possible to easily add different functions and extend the functions depending on the type of product. In addition, it is possible to easily connect the vehicle device 2 and the external device 3. Therefore, it is possible to obtain the same effects as in the first embodiment, such as the effect of easily performing the work of adding or extending functions after shipment.

Furthermore, in combination with the second embodiment, the external device 3 can be accessed from the external terminal 7. In addition, the access result is reflected in the vehicle device 2. Thereby, the vehicle system 1 can perform settings and the like of devices of the vehicle device 2 in advance or remotely without the person actually getting into the vehicle or operating the vehicle device 2. As described above, it is possible to obtain the same effects as in the second embodiment.

While the present disclosure has been described with reference to embodiments thereof, it is to be understood that the disclosure is not limited to the embodiments and constructions. The present disclosure includes various modifications and deformations within an equivalent range. In addition, various combinations and forms, and further, other combinations and forms including only one element, or more or less than these elements are also within the sprit and the scope of the present disclosure.

The controller and the method according to the present disclosure may be implemented by a dedicated computer provided by constituting a processor and a memory programmed to execute one or more functions embodied by a computer program. Alternatively, the controller described in the present disclosure and the method thereof may be implemented by a dedicated computer configured as a processor with one or more dedicated hardware logic circuits. Alternatively, the controller and the method according to the present disclosure may be implemented using one or more dedicated computers constituted by a combination of the processor and the memory programmed to execute one or more functions and the processor with one or more hardware logic circuits. Further, the computer program may store a computer-readable non-transitional tangible recording medium as an instruction to be performed by the computer.

The invention claimed is:

1. A vehicle system comprising:

a vehicle device having a first controlling function that is implemented regardless of a product type; and an external device that:

has a second function that is selectively implemented in accordance with the product type, is configured to operate the second function in an independent state when the external device is not connected to the vehicle device, is connected to the vehicle device via a communication line, has a battery, and by receiving a power supply from the battery, is configured to operate alone without being physically connected to the vehicle device, wherein:

the vehicle device is configured to execute the second function via the external device, the external device is configured to execute the first function via the vehicle device, in the independent state when the external device is not connected to the vehicle device, the external device is wirelessly accessed by a mobile terminal that is not mounted on a vehicle associated with the vehicle device and is different from the external device, acquires, as an access result, setting data or control data to be reflected in the vehicle device, and stores the access result in a storage of the external device, and when the external device is connected to the vehicle device, the external device transmits the stored access result to the vehicle device, and the vehicle device reflects the acquired access result in the vehicle device.

2. The vehicle system according to claim 1, further comprising an electronic control unit communicably connected to the vehicle device, wherein the external device is communicably connected to the electronic control unit via the vehicle device, and the external device is configured to use a function of the electronic control unit or the electronic control unit is configured to use the second function of the external device.

3. The vehicle system according to claim 1, wherein the external device has a function of which update is assumed to be necessary after a product shipment, or a function of which update frequency is relatively high as compared with the first controlling function of the vehicle device.

4. The vehicle system according to claim 1, wherein the external device includes a plurality of external devices, and the vehicle device is connectable to the plurality of external devices.

5. The vehicle system according to claim 1, wherein, in the independent state when the external device is not connected to the vehicle device and when the vehicle device is not operating, the external device acquires the access result.

6. A vehicle system comprising:

a first processor having a first function that does not depend on a product type; and a second processor that:

has a second function that is selectively implemented in accordance with the product type, is configured to operate the second function in an independent state when the second processor is not connected to the first processor, is connected to the first processor via a communication line, has a battery, and by receiving a power supply from the battery, is configured to operate alone without being physically connected to the first processor, wherein:

the first processor is configured to execute the second function of the second processor, the second processor is a main controller and is configured to execute the first function of the first processor, in the independent state when the second processor is not physically connected to the first processor, the second processor is wirelessly accessed by a mobile terminal that is not mounted on a vehicle associated with the first processor and is different from the second processor, acquires, as an access result, setting data or control data to be reflected in the first processor, and stores the access result in a storage of the second processor, and when the second processor is connected to the first processor, the second processor transmits the stored access result to the first processor, and the first processor reflects the acquired access result in the first processor.

* * * * *